Jan. 2, 1923.
J. F. McNEILL.
REAPER THRASHER MACHINE.
FILED MAY 28, 1917.
1,440,398
4 SHEETS-SHEET 3
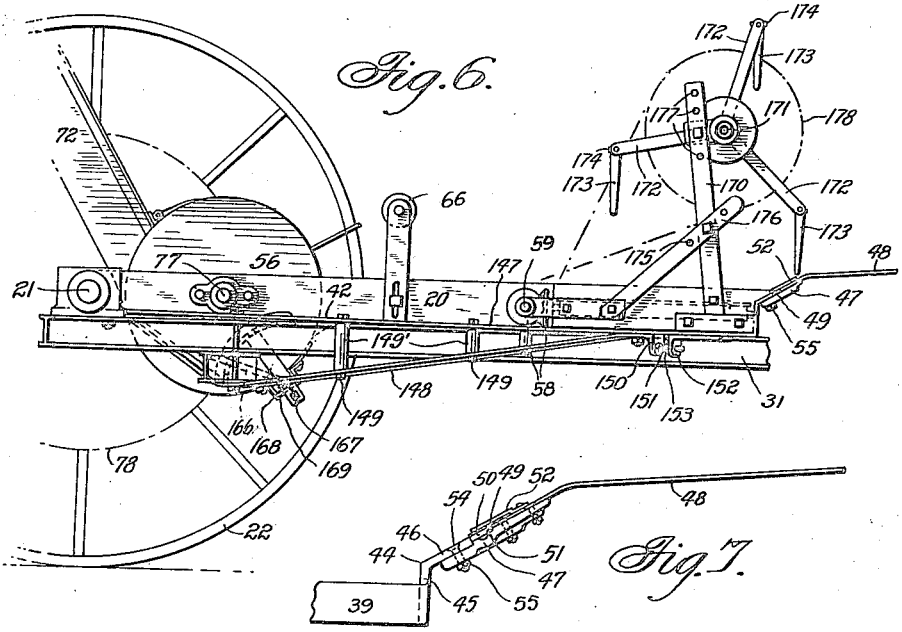
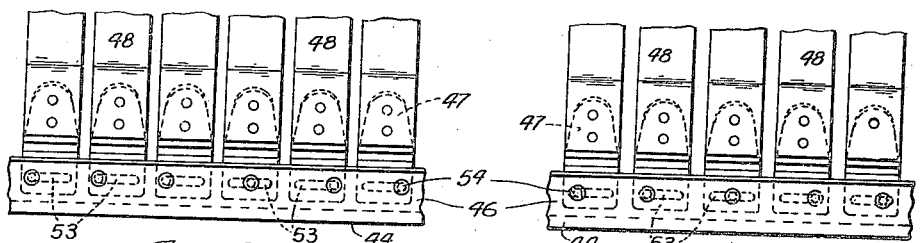
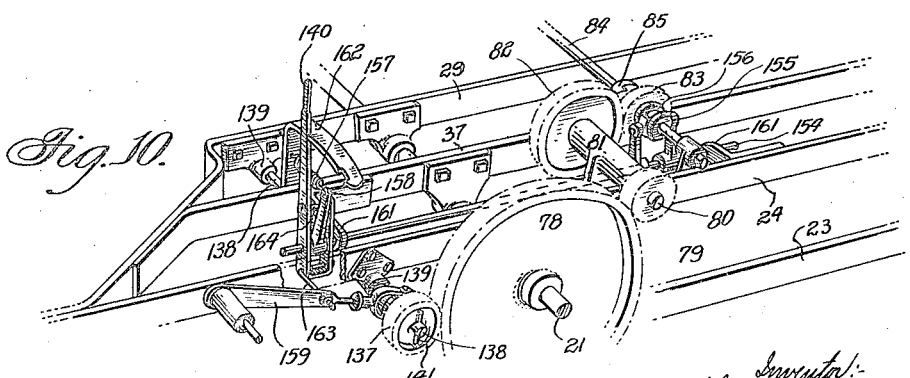

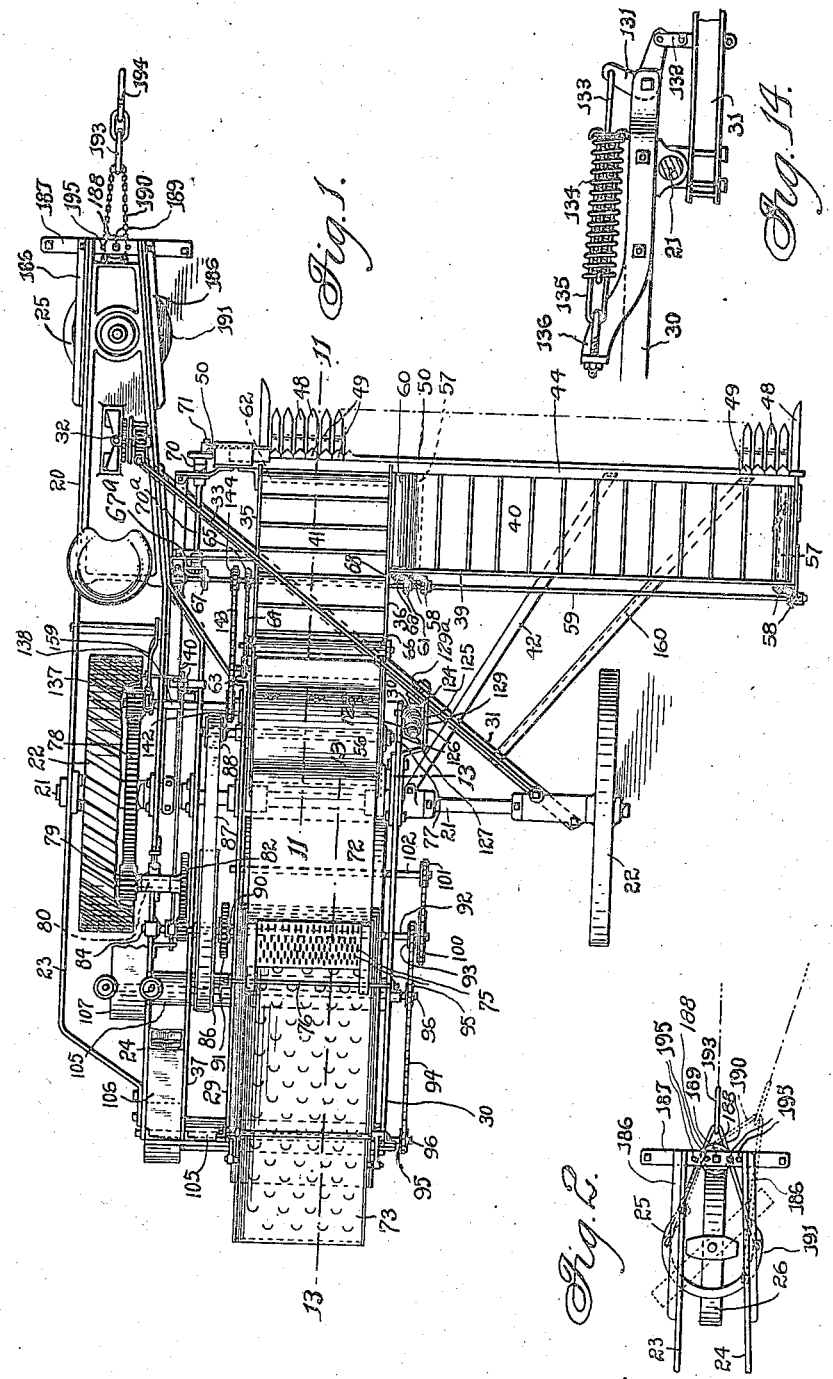

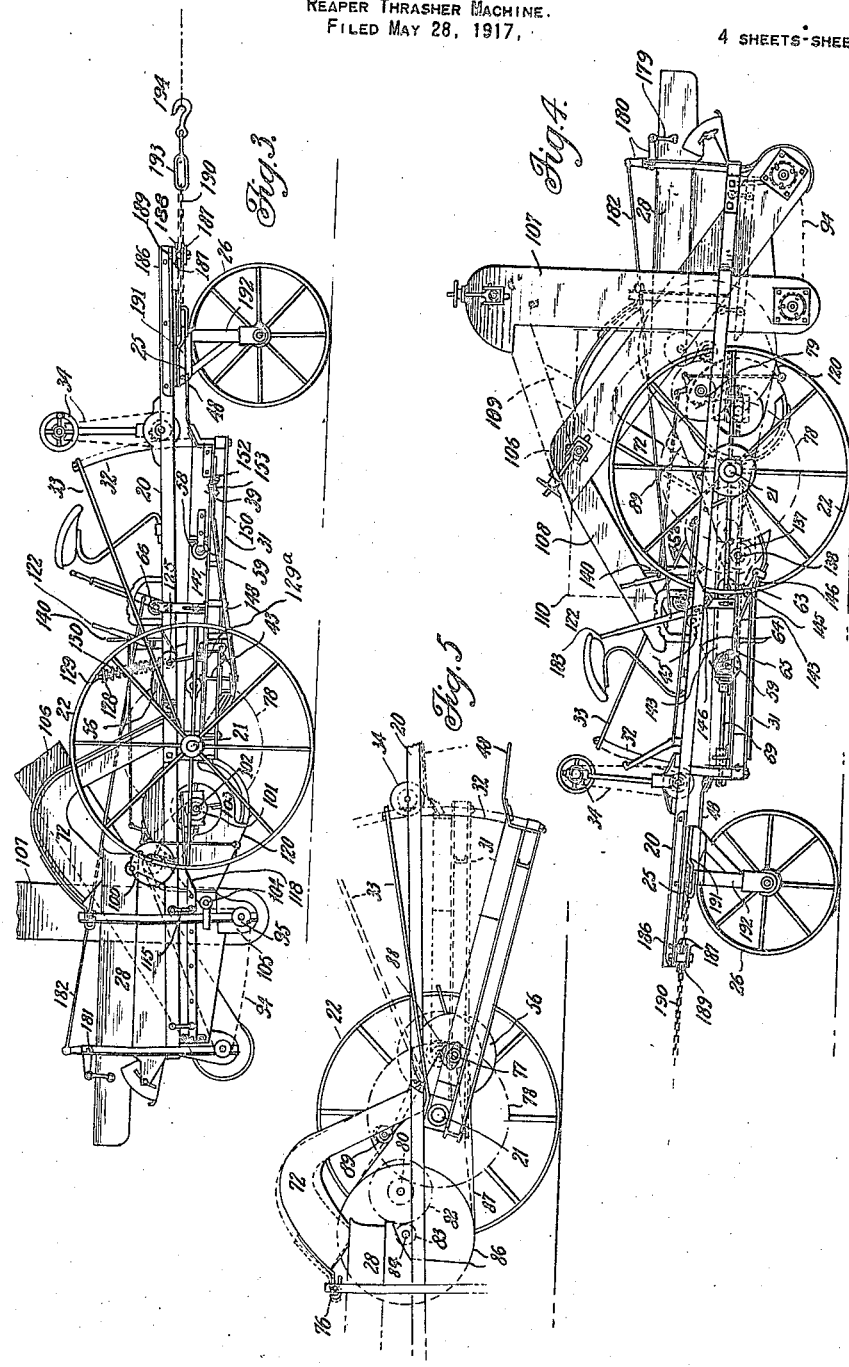

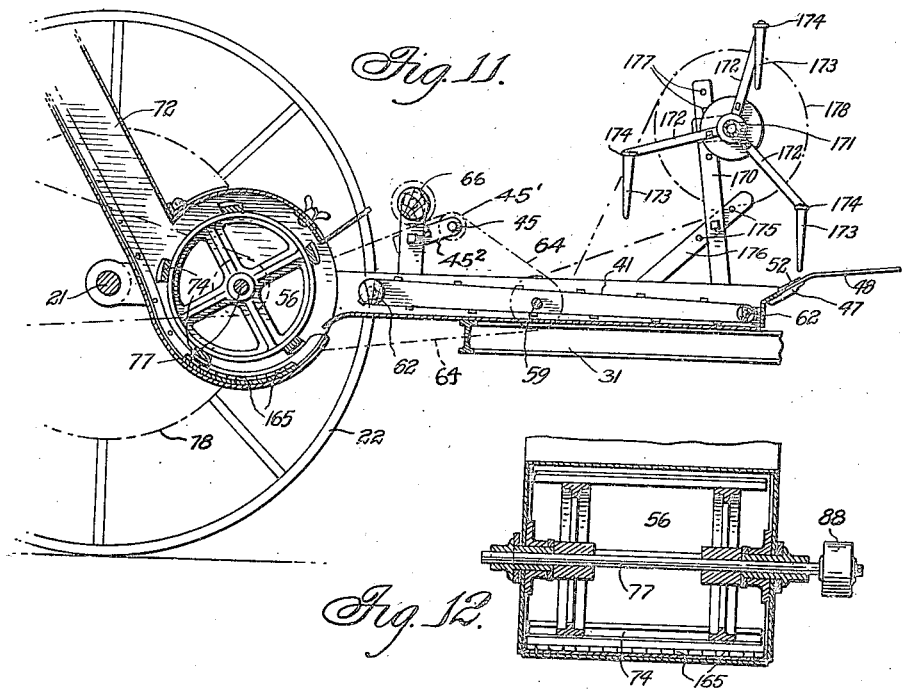
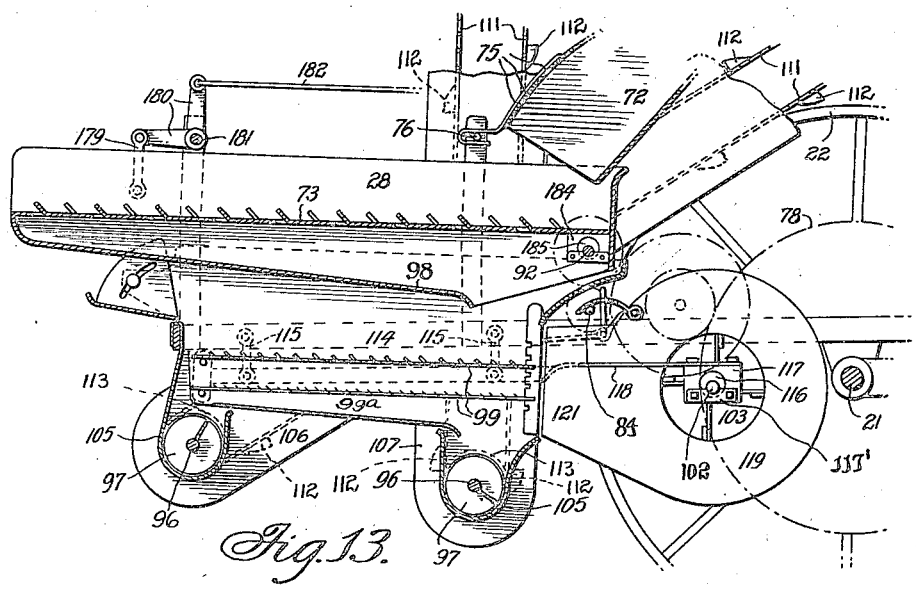

Patented Jan. 2, 1923.

1,440,398

UNITED STATES PATENT OFFICE.

JOHN FRANCIS McNEILL, OF STANMORE, NEW SOUTH WALES, AUSTRALIA, ASSIGNOR TO JAMES MARTIN AND COMPANY LIMITED, OF CONCORD WEST, NEW SOUTH WALES, AUSTRALIA.

REAPER-THRASHER MACHINE.

Application filed May 28, 1917. Serial No. 171,533.

*To all whom it may concern:*

Be it known that I, JOHN FRANCIS McNEILL, a subject of the King of Great Britain, residing at No. 1 Northumberland Avenue, Stanmore, in the State of New South Wales, Commonwealth of Australia, have invented certain new and useful Improvements in Reaper-Thrasher Machines, of which the following is a specification.

This invention relates to improvements in reaper thrasher machines that are adapted to cut the heads from a standing crop, thresh and winnow the heads and deliver the cleaned grain to boxes carried on the machines.

The object of the invention is to provide an improved reaping machine embodying a conveyor, a cutting mechanism, a comb bar on the front side of the frame which carries the conveyor, and forwardly and upwardly projecting fingers on the comb bar which cause the heads and straw of the grain to gravitate freely and quickly to the conveyor and thereby obviate loss of grain from the comb even when the comb is in lowered position.

With the above and other objects in view the invention consists in the construction, combination and arrangement of devices hereinafter described and claimed.

In order that the invention may be readily understood reference will now be had to the accompanying sheets of explanatory drawings, wherein:—

Figure 1 is a view in plan of a reaper thrasher machine constructed in accordance with the invention, portions being broken away to permit of the main operative parts being clearly illustrated.

Figure 2 is a view in plan of the fore part of the machine showing the means employed for automatically steering the same from the draught mechanism.

Figure 3 is a view in side elevation of the reaper thrasher viewed from the off side.

Figure 4 is a view in side elevation of the reaper thrasher viewed from the near side.

Figure 5 is a view in side elevation of part of the reaper thrasher viewed from the off side and hereinafter is fully described.

Figure 6 is a view in side elevation of the fore part of the reaper thrasher showing a portion of the improved frame and the means employed for sweeping the crop into the comb.

Figures 7, 8 and 9 are detail views showing the construction of the comb.

Figure 10 is a view in perspective of part of the frame and operative mechanism of the reaper thrasher.

Figure 11 is a view in sectional side elevation of the fore part of the reaper thrasher taken on the dotted line 11—11 of Figure 1 and drawn to a larger scale.

Figure 12 is a view in sectional elevation of the thrasher employed in the reaper thrasher.

Figure 13 is a view in sectional side elevation of the rear part of the reaper thrasher taken on the dotted line 13—13 of Figure 1 and drawn to the same scale as Figure 11.

Figure 14 is a view in side elevation of a modification in a constructional detail of the frame of the machine.

Throughout the drawings like characters of reference have been employed to indicate similar parts in the different views and the numeral 20 designates the main frame of the machine which comprises a plurality of flat bars arranged edgewise on and secured to an axle 21 carrying two main transport wheels 22. The two bars 23 and 24 on the near side of the axle 21 extend forwardly and are mounted at their front ends on a fore-carriage 25 having a leading or steering wheel 26 of ordinary design.

The near side or main transport wheel 22 is mounted between the two near side bars 23 and 24 and the winnower 28 is supported by and located between two of the inner bars 29 and 30 of the frame.

A flat bar 37 is arranged parallel to and midway between the bar 24 and the bar 29 and the front ends of said bars 37 and 29 converge outwardly and are bolted or otherwise secured together, while the end of the bar 29 is secured to the bar 24 in advance of the near side main transport wheel.

A stout beam 31 is pivotally mounted at its rear end on the axle 21 near the off side transport wheel 22 and is passed diagonally across the front of the machine.

The lower end of a curved raising and lowering rack 32 is fitted to the forward end of the diagonal beam 31 and the upper end of said rack 32 is supported or braced from the frame by a rod or rods 33.

The rack 32 passes through the forward part of the frame connecting the steering wheel 26 to the main axle 21 and is raised and lowered by gearing 34 of approved design.

A pair of bars or beams 35 and 36 are pivoted at their rear ends on the axle 21 near the two inner fixed bars 29 and 30 and their forward ends are connected to and support the near side end of a transverse frame 39 in which is mounted an endless conveyor apron 40. The bars or beams 35 and 36 rest upon and may be secured to the diagonal beam 31 to ensure rigidity to this part of the machine. A longitudinally disposed conveyor apron 41 is mounted between the bars or beams 35 and 36 pivoted to the axle 21 and said conveyor apron 41 operates at right angles to the transverse conveyor apron 40.

The off side end of the frame 39 carrying the transverse conveyor apron 40 is supported on an adjustable beam 42 that passes diagonally across the front of the machine and has its rear end pivoted to the axle 21 at an approved point. In order to ensure rigidity of construction the adjustable beam 42 is connected by clamping bolts 43 or the like to the diagonal beam 31 carrying the raising and lowering rack 32.

The parallel disposed bars 23, 24, 37, 29 and 30 comprise the main or fixed frame of the machine and the beams 31, 35, 36 and 42 comprise the pivoted frame of the machine.

The front bar of the frame 39 designed to carry the transverse conveyor apron 40 is preferably formed of an angle bar 44, one flange 45 of which is arranged vertically and with the opposite flange 46 projecting forwardly at an obtuse angle thereto.

The forwardly projecting flange 46 of the angle bar 44 is fitted with a series of adjustable brackets 47 to which are fitted forwardly projecting fingers 48 of the comb for gathering the crop and holding it in position while being cut with a knife 49 that is reciprocatingly mounted on the brackets 47 at the base of the fingers 48.

The brackets 47 are set at or approximately at the same angle as the forward flange 46 of the angle bar and the fingers 48 are bent so that their rear ends are at the same angle as the brackets and their forward ends are horizontal or nearly so. The inclined portions at the rear ends of the fingers approximate in length to the lengths of the blades of the knife 49. The inclination of the knife 49 and rear end of the fingers 48 is of special importance, providing as it does means whereby all the heads and straw will gravitate freely and quickly to the conveyor aprons 40 and 41 and loss of grain from the comb will thereby be obviated even when the comb is in its lowermost position. The horizontal or approximately horizontal front ends of the fingers 48 can be of any approved length to pick up the fallen crop and hold the same to be cut according to the position of the comb.

The knife bar 50 is mounted between the forward edge of the angle bar 44 and ribs or shoulders 51 formed transversely on the upper faces of the finger brackets 47. The knife bar 50 is retained in its correct position on the finger brackets by means of plates 52 that have their forward ends bolted or otherwise secured to the top of the fingers 48 and their rear ends overlapping the blades on the knife bar 50, see Figure 7 of the drawings.

The inner ends of the finger brackets 47 are formed with transverse slots 53 through which pass the threaded ends of bolts 54 that pass downwardly through the forward flange of the angle bar 44. The spaces between the fingers 48 can be increased by removing some of the fingers and adjusting the positions of the remaining fingers by means of the slots 53 in the finger brackets 47.

When the fingers 48 are adjusted as desired they are secured firmly in position by screwing up nuts 55 on the fastening bolts 54.

The conveyor apron 40 mounted in the transverse frame 39 is adapted to deliver the severed heads and straw on to the forward end of the longitudinally disposed conveyor apron 41 that passes from the near side end of the said frame back to a thrasher 56.

A thrasher 56 is mounted between the rear ends of the pivoted beams 35 and 36 carrying the longitudinal conveyor apron 41. The transverse conveyor apron 40 is mounted on rollers 57 that are driven by gearing 58 from a shaft 59 passing transversely across the back of the conveyor frame 39.

A roller 60 may be interposed between the end of the transverse conveyor apron 40 and the forward part of the longitudinal conveyor apron 41 to facilitate the delivery of the heads and straw from the first mentioned apron to the last mentioned apron. The said roller 60 when used is operated in the same direction as the transverse conveyor apron 40 by means of gears 61, 68 from the shaft 59 mounted at the rear of the conveyor frame 39.

The longitudinal conveyor apron 41 is carried on rollers 62 disposed transversely on the bars or beams 35 and 36 pivoted to the axle 21 and the journal on the near side end of the rear roller 62 is fitted with a chain sprocket 63. A chain 64 connects the sprocket 63 on the said journal with a sprocket 65 on the shaft 59 passing across the back of the transverse conveyor frame 39. A sprocket 45¹ is mounted on an arm 45² and serves to keep desired tension on the chain 64.

A spiked or fluted roller 66 is located above the rear end of the longitudinal conveyor apron 41 and the said roller facilitates the feeding of the heads and straw carried by the apron into the mouth of the thrasher 56.

The inner end of the shaft 59 passing across the back of the conveyor frame 39 is fitted with a bevel pinion 67 that gears with a like pinion 67ᵃ fitted to the rear of a spindle 70ᵃ mounted revolvably in bearings 70 on the forward part of the pivoted frame of the machine. The forward end of the said spindle 70ᵃ is fitted with a crank 71 that is connected to and adapted to impart a reciprocatory movement to the knife bar 50.

The thrasher 56 is located close to the axle 21 and has a slight rise and fall when the forward end of the pivoted part of the main frame is raised and lowered to suit the different heights of a crop.

The threshed grain and straw are discharged from the thrasher through a throat 72 that passes upwardly from the back thereof. The upper end of the throat 72 curves rearwardly and downwardly and directs the threshed grain and straw on to the forward end of straw walkers or a coarse screen 73 in the top of the riddle box of the winnower 28. The back or upper part of the discharge end of the throat 72 is formed with perforations 75 to permit of the escape of the draught occasioned by the action of the beaters in the thrasher. Any ordinary form of straw walker or bumper can be used in lieu of the coarse screen 73 and the said walker or bumper can be operated in any approved way.

The discharge end of the throat 72 on the thrasher 56 is loosely connected to a spindle 76 or the like fitted transversely to the top of the winnower 28 and this loose connection permits of a free movement of the throat when the pivoted part of the main frame is raised and lowered.

The drum of the thrasher 56 is mounted on a shaft 77 carrying the beaters 74 and it is free to oscillate thereon when the pivoted part of the frame is raised and lowered.

A crown wheel or segment 78 is fitted concentrically on the inside of the near main wheel 22 and said crown wheel meshes with a pinion 79 carried on a short transverse shaft 80 located at the rear of the axle 21. The short transverse shaft 80 is mounted in a long bearing 81 fitted to the main frame of the machine and a spur wheel 82 on said shaft gears with a pinion 83 on a second shaft 84 mounted on said frame and disposed transversely in advance of the riddle box of the winnower 28.

The pinion 83 on the shaft 84 is slidably mounted thereon and its inner face is designed to engage a clutch member 85 fitted to said shaft—see Figure 10 of the drawings.

A large belt pulley 86 is fitted to the shaft 84 inside the pinion 83 and a belt 87 connects said pulley to a smaller pulley 88 fitted to the shaft 77 carrying the beaters of the thrasher.

A spring controlled jockey pulley 89 (shown in dotted lines in Figure 4) can be employed to adjust the tension on the belt 87 as desired. The jockey pulley 89 is located in such a position that it ensures a correct tension being kept on the belt 87 when the pivoted frame is raised or lowered to suit the height of a crop.

A small pinion 90 is fitted to the shaft 84 on the inside of the large belt pulley 86 and the said pinion meshes with a spur gear 91 fitted to the end of a shaft 92 that passes transversely through the forward end and upper part of the riddle box of the winnower 28. When rotary or other forms of straw walkers are employed they are driven from the shaft 92 by chain or sprocket gearing in an approved way.

The off side end of the shaft 84 that passes transversely across the front of the riddle box of the winnower 28 is fitted with a sprocket 93 that is adapted to impart motion through a chain 94 to sprockets 95 fitted to the shafts 96 of Archimedean screw conveyors 97 operating transversely in the bottom of the riddle box of the winnower.

The grain and chaff that pass through the coarse riddle 73 or straw walkers fall upon an inclined floor 98 which directs the said grain and chaff to the forward end of the riddle box of the winnower where it falls upon the uppermost of a plurality of superposed riddles 99 located therein.

In lieu of driving the straw walkers by chain and sprocket gearing any other approved form of gearing can be employed for the purpose.

The off side end of the shaft 84 is fitted with a sprocket 100 which is connected by a chain to a small sprocket 101 fitted to the end of a shaft 102 passing axially through a fan chamber 103 that is located between the riddle box of the winnower and the axle 21.

The chain 94 is passed over an adjustably mounted idle sprocket 104 that is adapted to keep the chain bearing correctly on the sprockets 95 on the shafts 96—see Figure 3 of the drawings.

The shafts 96 at the bottom of the riddle box of the winnower 28 pass axially through troughs 105, one near the front end and the other at the rear end of the riddle box and the partially threshed heads are delivered from the riddles 99 to the rear trough and the clean grain is delivered to the front trough.

The shafts 96 passing axially through the troughs 105 are fitted with Archimedean screws 97 for conveying the grain and partially threshed grain to the lower ends of elevators 106 and 107. The elevator 106 on the rear trough 105 conveys the partially threshed grain to a chute 108 that delivers it to the thrasher 56 or to the apron 41 delivering thereto.

The elevator 107 on the front trough 105 conveys the clean grain upwardly to a chute or chutes 109 that direct it into a grain box 110 located above and outside the main wheel in the ordinary way. The chutes 109 and grain box 110 are shown in dotted lines in Figure 4 of the drawings.

The chains 111 carrying the buckets 112 of the elevators 107 and 108 are driven from sprockets 113 fitted to the shafts 96 passing axially through the troughs 105 on the bottom of the riddle box 99$^a$ of the winnower—see Figure 13 of the drawings.

The frame 114 supporting the riddles 99 is swung on links 115 that are connected to the stationary part of the riddle box or frame of the machine in an approved way. A fore and aft reciprocating movement is imparted to the riddles 99 by means of eccentrics 116 fitted to the projecting ends of the fan shaft 102. The said eccentrics 116 operate in blocks 117 that are connected by flexible bars 118 to the riddle frame 114 in an approved way.

The blocks 117 are provided with side plates 117$^1$ and these side plates are so placed that they will retain the oil delivered to the eccentrics 116 for lubricating purposes. The forward ends of the flexible bars 118 act as connecting bars between the eccentrics 116 and the riddle box and their rear ends are bolted to and serve to stiffen or straighten the said riddle box.

The blast of the fan 119 is directed across the riddles 99 of the winnower 28 and the said blast can be regulated by adjusting a flap 120 in the bottom of a throat 121 from the fan chamber 103. The said flap 120 is operated by a lever 122 and connecting rods and crank (see Figures 3 and 4) arranged in any approved way.

The inner longitudinal fixed bar 30 of the main frame of the machine passing along the off side of the winnower 28 has its forward end projecting in advance of the axle 21 and is bifurcated to carry a pivot block 124. The block 124 is formed with trunnions 125 that pivot in holes in the jaws 126 of the bifurcated front end of the bar and a hole is formed vertically in the said block to accommodate a rod 127 that is carried by the pivoted frame of the machine. The rod 127 is pivotally connected at its lower end as at 129$^a$ (Figs. 1 and 3) to the diagonal beam 31 of the pivoted frame and a cap 128 and nut 129 are fitted to the upper end thereof. A strong compression spring 130 is arranged to bear at one end against the block 124 and at the opposite end against the cap 128 on the upper end of the rod 127.

In an alternate construction a bell-crank or the like 131 can be pivoted on the forward end of the said bar 30 and one arm of said bell-crank is connected by a link 132 to the pivoted frame and the opposite arm is provided with a rod 133 that is arranged to pass through a compression spring 134 disposed horizontally on the main frame. A second rod 135 passes through the compression spring 134 and is supported on a bracket 136 fitted to the bar 30. The construction is so arranged that it permits of a uniform upward pressure being maintained on the pivoted frame at the different points of its movement.

The resilient connection between the main and pivoted frames is designed to take some of the weight of the rear or overhanging part of the main frame and to facilitate the raising and lowering of the pivoted frame.

A pinion 137 meshes with the front of the crown wheel or segment 78 and said pinion is slidably mounted on a shaft 138 carried in bearings 139 fitted to the main frame and put into fixed relationship therewith by a clutch lever 140 that is adapted to force the outer or clutch face of the pinion into and out of engagement with a pin 141 passing diagonally through said shaft—see Figure 10 of the drawings.

A sprocket 142 is fitted to the shaft 138 carrying the slidably mounted pinion 137 and said sprocket is connected by a chain 143 to a sprocket 144 fitted to the shaft 59 passing across the rear of the frame 39 carrying the transverse conveyor apron 40.

A roller 145 fitted to a spring controlled arm 146 is employed to keep a desired tension constantly on the chain 143 connecting the sprocket 142 on the shaft 138 to the sprocket 144 on the shaft 59 at the rear of the transverse conveyor apron 40. The sprocket 145 and spring controlled arm 146 are arranged to keep a tension on the chain 143 at all times when the pivoted frame is being raised and lowered.

The diagonal beam 42 supporting the off side end of the transverse conveyor frame 39 is formed of two superposed bars or straps 147 and 148 that are connected at different points in their lengths by bolts 149 or stays having spacing pieces 149$^1$ fitted thereover.

The forward part of the lower bar or strap 148 of the beam inclines upwardly to the upper bar or strap 147 and the forward end of the lower bar or strap is bent downwardly at its front end to form an abutment 150 for the end of a set screw 151 that is carried on a lug or bracket 152 depending from the forward end of the top bar or strap 147.

The set screw 151 screws into the depending lug or bracket 152 and is fitted with a lock nut 153 to hold it firmly in any adjusted position. By adjusting the set screw 151 the outer end of the diagonal beam 42 can be raised and lowered to place the outer end of the transverse conveyor frame 39 in any desired position to ensure a correct horizontal alignment of the fingers of the comb.

The clutch pinion 83 on the shaft 84 is controlled by a longitudinally disposed rod 154 having a cranked end 155 that engages a grooved collar or sleeve 156 on the said pinion. A spring 157 is connected to an arm 158 on the forward end of said rod 154 and tends to keep the clutch always in mesh.

The pinion 137 meshing with the front of the crown wheel or segment 78 is kept in mesh with the clutch pin 141 by a flat spring 159 fitted to the frame of the machine.

A lever 140 is arranged to operate both pinions 83 and 137 to and from their clutches and the rear clutch pinion 83 if overdriven will declutch without affecting the pinion 137 on the front of the crown wheel.

The rod 154 is rockingly mounted in brackets 161 fitted to the main frame and the lever 140 is pivotally mounted on its front end. A quadrant 162 is fitted to the main frame and is adapted to hold the lever in position to retain the pinions 83 and 137 in their free positions as and when desired.

A rod 163 or other suitable device loosely connects the lower part of the lever 140 to the flat spring 159 which is employed to keep the pinion 137 in mesh with the crown wheel or segment on the main wheel.

A stud 164 or the like projects rearwardly from the lever 140 and is adapted to lie against the inner face of the arm 158 on the rod 154. An outward movement of the lever 140 causes the stud 164 to bear against and move the arm 158 outwardly and thereby force the pinion 83 out of engagement with clutch member 85. The outward movement of the upper end of the lever 140 causes the spring 159 to be drawn inwardly and thereby moves the clutch face of the pinion 137 out of engagement with the pin 141 on the outer end of the shaft 138.

The bottom of the thrasher drum is fitted with concaves 165 and is made adjustable to suit the crop being harvested and the said bottom is capable of being raised and lowered by operating a lever 166 that is fitted to or formed on a rod 167 carrying eccentrics 168. The said eccentrics 168 are fitted operatively in straps 169 or the like fitted to the underside of the movable bottom portion of the thrasher drum.

The ends of the transverse conveyor frame 39 are fitted with adjustable standards 170, on the upper ends of which are mounted adjustable bearings for the ends of a tubular shaft 171. The ends of the shaft 171 are fitted with radial arms 172 that are designed to pivotally support broad blades 173 of wood or other preferred material.

The blades 173 are provided on their upper edges with metal straps 174 the ends of which are rounded to pivot in the ends of the radial arms 172. The said blades 173 are narrower at their lower edges than at their upper edges and when the tubular shaft 171 is rotated the blades direct the heads of the standing crop into the spaces between the fingers and the severed heads and grain on to the conveyor aprons 40 and 41. The construction above described forms an efficient reel and the blades thereof feather automatically while rotating.

The standards 170 supporting the tubular shaft 171 can be adjusted to place the blades of the reel nearer to or further away from the fingers and conveyor aprons by means of holes 175 in stays 176 and by adjustment holes 177 in the standards. The tubular shaft 171 of the reel is driven by chain and sprocket gearing 178 from the shaft 59 or any other convenient movable part of the machine.

In lieu of employing rotary straw walkers to separate the straw from the threshed and partially threshed grain we may substitute therefor the coarse riddle 73 and impart a reciprocating motion thereto by any suitable means. The rear end of the said riddle 73 is supported by links 179 from the rearwardly projecting arms of a bell-crank 180 fitted to a rocking shaft 181 that is controlled by a rod 182 and lever 183 from a forward part of the machine. By adjusting the said lever 183 the rear end of the coarse riddle 73 will be given a greater or lesser inclination and upward throw. The forward end of the riddle 73 is provided on its underside with blocks 184 which are formed to embrace eccentrics 185 fitted to the shaft 92. In an alternate construction the front end of the riddle 73 can be suspended on links 179 and the rear end mounted on eccentrics 185 or an approved form of crank.

If preferred, an additional stay or beam 160 can be arranged diagonally on the off side of the pivoted frame to assist in supporting the outer end of the frame 39.

The draught gear can be connected to the fore-carriage on the front of the main frame as shown in Figures 1 to 4 of the drawings whereby the angle taken by the steering wheel in rounding corners will be greater than that taken by the draught animals or hauling engine.

A short angle iron bar 186 is bolted to each side of and projects beyond the front end of the main frame. The ends of the bars 186 projecting beyond the front of the main frame are connected by cross plates 187 which are spaced apart to permit of a grooved roller 188 being operatively supported therebetween on a pin 189.

A chain, or like flexible member 190 is looped around the roller 188 and its ends are secured to opposite sides of the movable part of a turntable 191 of the fore-carriage. In lieu of connecting the ends of the chain 190 to the turntable 191 they may be connected to the sides of the fork 192 supporting the steering wheel 26.

A link 193 engages the looped end of the chain 190 and connected to said link is a hook 194 to which the hauling gear of the draught animals or engine is attached.

The link 193 will not slide along the chain 190 when the hauling strain is applied thereto, and when the draught animals are making a turning that side of the loop of the chain 190 opposite to the direction taken by the animals will bear against and move around the roller 188 thereby causing the wheel 26 to move in advance and assume a greater angle than the said draught animals, see Figure 2 of the drawings.

The position of the roller 188 can be adjusted between the plates 187 by means of the holes 195 formed therein to permit the normal line of draught to be altered to suit the different conditions under which the machine is operating. When the position of the roller is altered the link 193 is adjusted on the chain 190 so that the sides in the loop will be touching or be located at equal distances on both sides of the roller when the draught animals are moving forwardly in a straight line.

What I do claim is:

1. In a reaper thrasher, a conveyor frame pivotally supported upon the main axle for angular movement, a comb bar rigidly secured to the front transverse beam of said frame and projecting upwardly and forwardly at an angle therefrom, fingers adjustably supported by said comb bar and projecting forwardly and substantially horizontally therefrom, and a reciprocating cutter mechanism mounted at the rear of said fingers.

2. In a reaper thrasher, a frame pivotally supported upon the main axle, a comb bar rigidly secured to said frame and projecting forwardly therefrom, brackets adjustably secured to the underside of the projecting portion of said comb bar, fingers rigidly secured to said brackets and projecting substantially horizontally therefrom, and a cutter mechanism mounted upon said brackets at the rear of said fingers.

3. In a reaper thrasher, a comb carrying frame having a forwardly and upwardly inclined portion, correspondingly inclined adjustable brackets secured to said portion, fingers having correspondingly inclined rear portions secured on said brackets, and a correspondingly inclined knife bar and knives mounted on said brackets, said knife bar bearing against the front edge of said forwardly and upwardly inclined portion of the comb carrying frame.

4. In a reaper thrasher, a comb bar of angle metal on the front of the conveyor frame having one flange projecting upwardly and forwardly at an angle, a series of brackets inclining upwardly from the forwardly projecting flange of the comb bar, fingers on the brackets having their rear ends set at an angle and their forward ends set approximately horizontally, means for adjusting the brackets laterally on the comb bar, and a knife bar mounted reciprocatorily on the brackets between the forwardly projecting flange and the rear ends of the fingers.

In witness whereof I have signed this specification in the presence of two witnesses:

JOHN FRANCIS McNEILL.

Witnesses:
A. J. CALLINAN,
W. A. ASHLOW.